Patented Aug. 26, 1947

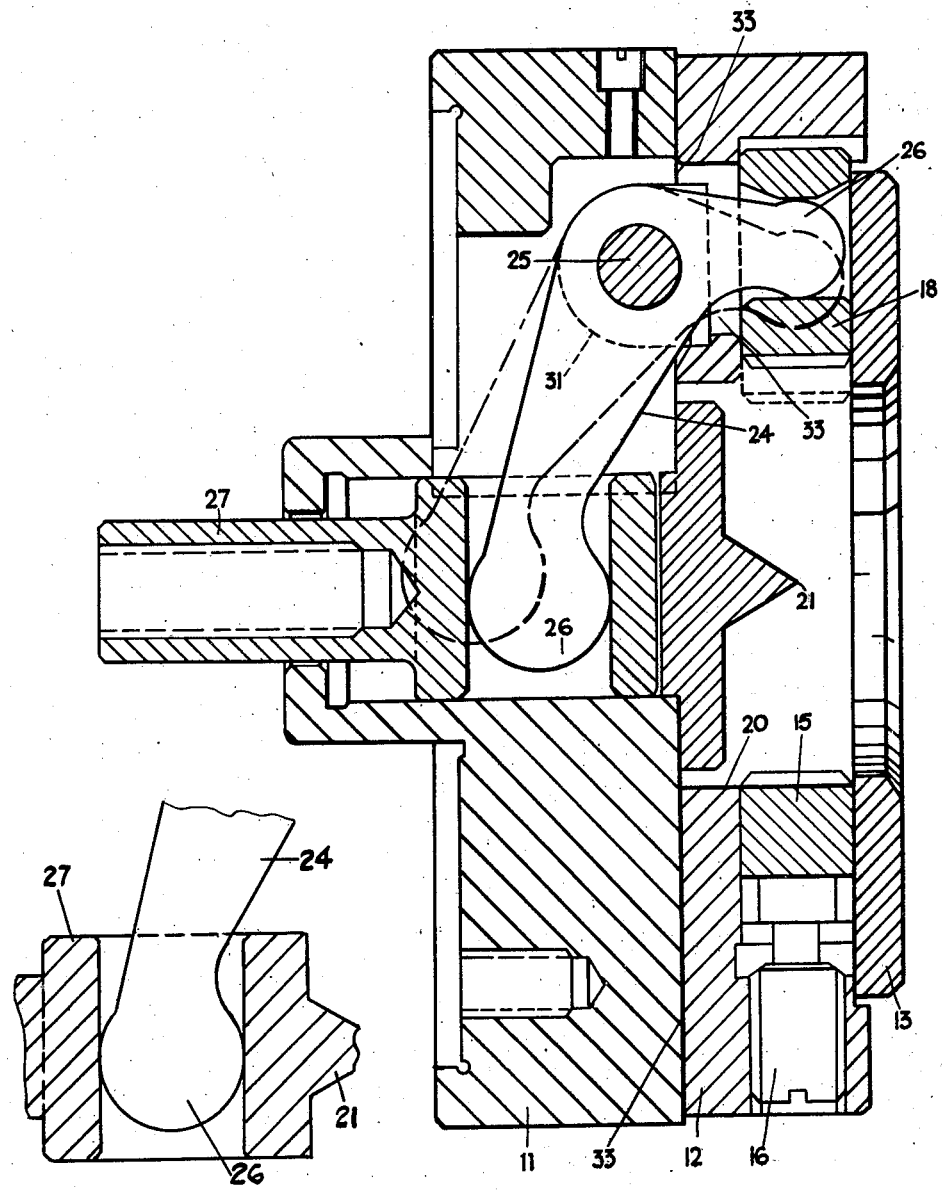

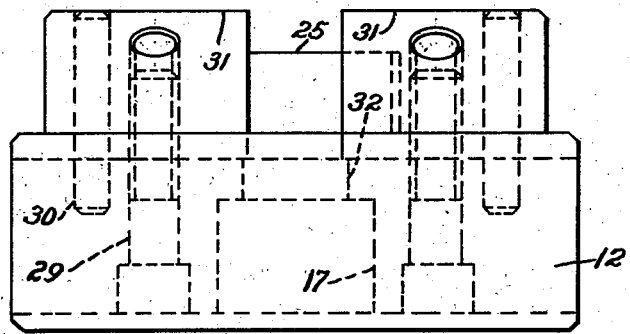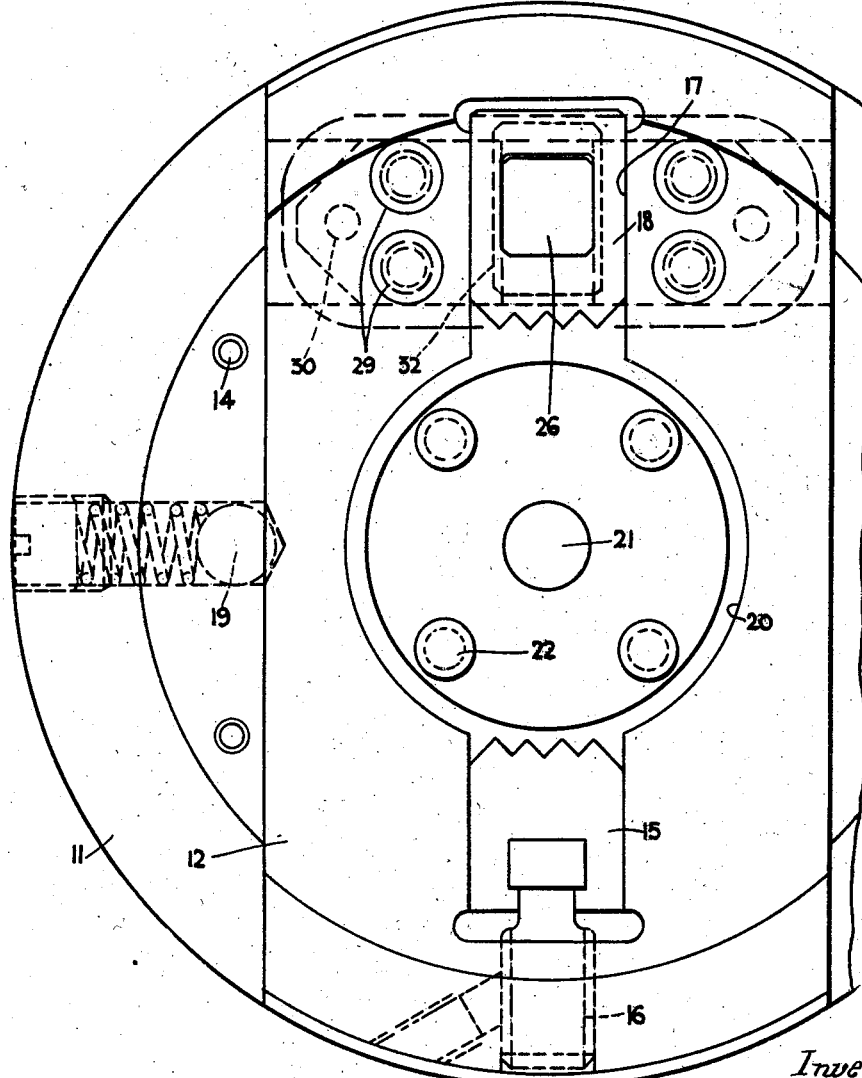

2,426,376

UNITED STATES PATENT OFFICE 2,426,376

CHUCK FOR MACHINE TOOLS

Cosby D. P. Smallpeice, near Southampton, England

Application November 24, 1944, Serial No. 564,996
In Great Britain December 10, 1943

4 Claims. (Cl. 279—119)

1

This invention relates to chucks for lathes or other machine-tools, and particularly to the kind having a draw-bar slidably extending through the spindle of the machine-tool for effecting actuation of the chuck, though the invention is not limited in this respect.

My main object is to provide a very simple form of work-driving means which will be easily operable and free to float in a radial direction, as necessary, for centering purposes.

A further object is to provide a chuck which includes a block which is slidable transversely of the spindle and carries at least one fixed jaw, though in ordinary conditions this will preferably be adjustable, and an opposed jaw slidably carried by the block and connected to a draw-bar, carried axially of the spindle, by a lever which is fulcrumed on the block so that axial movement of the draw-bar will slide the jaws relatively to one another dependently upon the direction of the axial movement. Preferably the lever ends are slidingly engaged in slots in the slidable jaw and the draw-bar respectively.

If desired air pressure or other actuating means for the draw-bar may be carried by the spindle remote from the chuck in a manner known per se, and the spindle may have fast upon it a centre point, for the work, extending through an opening provided in the block. Alternatively, a centre point for the work, extending through an opening in the block, may be carried by the draw-bar, the latter being biassed towards the work (in the chuck-opening direction) such that axial pressure exerted by the tail-stock centre on the work will close the chuck. In this case, of course, the draw-bar is only of sufficient length to ensure that it will be adequately supported by the spindle.

A further object of the invention, in the case in which closure of the chuck is effected by movement of the draw-bar in a direction away from the work, is to combine therewith the interposition of a frictional material, such as a fabricated fabric lining, between the block and the spindle, such that the chuck-closing thrust of the draw-bar will bias the block and spindle against the frictional material and thus tend to hold the block against radial movement when the chuck is closed.

For a better understanding of these and other objects and advantages of the invention attention should be directed to the following description, wherein reference is made to the accompanying drawings, of which:

Figure 1 is a sectional elevation of one arrangement according to the invention, Figure 1a being a fragmentary view showing a modification;

Figure 2 is a fragmentary axial elevation thereof with a cover-ring removed; and Figure 3 is a plan of the slidable block.

In the construction shown, the spindle terminates with a fly wheel or body 11 having a transverse groove of generous dimensions formed in its end radial face, and mounted in this groove is the slidable block 12, retained in position by a cover-ring 13 secured by bolts adapted to engage holes 14 in the body. The block 12 has one fixed jaw 15 which in this instance is adjustably mounted, being positionable radially by means of a screw 16 in the block in a manner known per se. Opposite the fixed jaw the block is provided with a radial slot 17 to receive a sliding jaw 18. The block is yieldably held in a centered position by means of a spring-pressed ball 19 engaged with a V-slot on the surface of the block, the ball being adjustably carried by the spindle body 11. At its centre the block is recessed, as shown at 20, and extending thereinto is a centre point 21 fast on a plate secured as by screws 22 to the centre of the body.

24 is a bell-crank lever pivotally mounted at 25 upon a pin which is fast with the slidable block 12, the bell-crank lever having ball or roller-like portions 26 at its ends respectively engaged in transverse slots in the slidable jaw 18 and in the end of a draw-bar 27 coaxial with and extending along the interior of the spindle. The draw-bar may be actuated by means of an air cylinder carried by the spindle at its end remote from the chuck in a manner known per se, or it may be actuated manually or in other ways.

With reference to Figure 3, it will be observed that the block 12 has secured to it, as by screws 29 and dowels 30, two spaced bosses 31 in which the pivot pin 25 is supported. The bell-crank lever 24 extends through a slot 32 in the block 12.

In operation the end of the workpiece to be gripped is passed through the opening in the cover-ring 13 and an axial thrust then applied to the draw-bar to move it to the left (Figure 1) which will cause the clockwise rotation (Figure 1) of the bell-crank lever roughly to the position indicated by the chain lines—except that the pull, whilst moving the slidable jaw 18 radially inwardly, will also move the block 12 as a whole to carry the fixed jaw 15 radially inwardly once the slidable jaw has engaged the work—whereby to grip the work with any desired pressure whilst allowing the work to retain location on the centre point 21.

I may provide a lining of frictional material at the contacting surfaces 33, i. e., between the contacting faces of the body 11 and the block 12, such that the axial thrust exerted by the draw-bar will tend to pull the block 12 axially towards the body 11, the frictional lining then serving for biassing the block against radial movement whilst the chuck is closed.

It will be understood that if the centre point 21, instead of being fast with the body is carried by the end of the draw-bar 27, as shown by Figure 1a, the chuck can be automatically closed by applying pressure from the tail-stock through the work on to the centre point 21, sufficient pressure being applied to move the draw-bar as necessary to turn the lever 24. Actually, in this case, the draw-bar would only need to extend through the spindle as far as is necessary to ensure that it is adequately supported.

What I claim as my invention and desire to secure by Letters Patent of the United States is:

1. A chuck, for a machine-tool, which is operable by a draw-bar slidable axially within the spindle, including a block slidable transversely of the spindle and carrying at least one jaw fixed thereto, an opposed jaw slidably carried by the slidable block, and a lever fulcrumed on the slidable block and connected to the draw-bar and to the said opposed jaw so that axial movement of the draw-bar will slide the jaws radially with respect to the spindle.

2. A chuck, for a machine-tool, which is operable by a draw-bar slidable axially within the spindle, including a block slidable transversely of the spindle and carrying an adjustable jaw, an opposed jaw slidably carried by the slidable block, and a lever fulcrumed on the slidable block, the ends of the lever being slidably engaged in slots in the draw-bar and the said opposed jaw respectively so that axial movement of the draw-bar will slide both of the jaws radially with respect to the spindle.

3. A chuck, for a machine-tool, which is operable by a slidable draw-bar, the chuck including a body, a block slidable transversely of the body and carrying at least one jaw fixed thereto, an opposed jaw slidably carried by the slidable block, a lever fulcrumed on the slidable block and connected to the draw-bar and to the said opposed jaw so that axial movement of the draw-bar will slide the jaws radially with respect to the spindle, and a centre point, for the work, carried by the draw-bar and extending into a central opening of the slidable block.

4. A chuck, for a machine-tool, which is operable by a slidable draw-bar, being closed by the sliding of the draw-bar in a direction away from the work, the chuck including a body, a transversely slidable block carrying at least one jaw fixed thereto, an opposed jaw slidably carried by the slidable block, frictional material interposed between the body and slidable block, and a lever fulcrumed on the slidable block and connected to the draw-bar and to the said opposed jaw so that axial movement of the draw-bar will slide the jaws radially with respect to the spindle.

COSBY D. P. SMALLPEICE.

REFERENCES CITED

The following references are of record in the file of this patent:

UNITED STATES PATENTS

| Number | Name | Date |
| --- | --- | --- |
| 629,713 | Couch | July 25, 1899 |
| 2,103,350 | Drissner | Dec. 28, 1937 |
| 2,324,130 | Beckwith | July 13, 1943 |
| 2,327,897 | Howard | Aug. 24, 1943 |